United States Patent [19]

Izawa et al.

[11] 4,425,146
[45] Jan. 10, 1984

[54] METHOD OF MAKING GLASS WAVEGUIDE FOR OPTICAL CIRCUIT

[75] Inventors: Tatsuo Izawa, Musashino; Hidefumi Mori, Tokyo; Nobuo Shimizu, Iruma; Yasuji Murakami, Tokorozawa, all of Japan

[73] Assignee: Nippon Telegraph & Telephone Public Corporation, Tokyo, Japan

[21] Appl. No.: 213,069

[22] Filed: Dec. 4, 1980

[30] Foreign Application Priority Data

Dec. 17, 1979 [JP] Japan ................................ 54-162740
Dec. 17, 1979 [JP] Japan ................................ 54-162741
Dec. 17, 1979 [JP] Japan ................................ 54-162742
Oct. 31, 1980 [JP] Japan ................................ 55-152173

[51] Int. Cl.$^3$ ............................................ C03B 19/00
[52] U.S. Cl. .................................... 65/18.2; 65/3.12; 65/31; 65/60.8
[58] Field of Search ........................ 65/3.12, 3.2, 18.2, 65/31, 60.8; 427/163

[56] References Cited

U.S. PATENT DOCUMENTS

| | | | |
|---|---|---|---|
| 3,306,768 | 2/1967 | Peterson | 65/3.12 X |
| 3,785,717 | 1/1974 | Creset et al. | 350/96.12 |
| 3,806,223 | 4/1974 | Keck et al. | 350/96.12 |
| 3,843,392 | 10/1974 | Sterling et al. | 65/3.12 |
| 3,850,687 | 11/1974 | Kern | 427/94 |
| 3,934,061 | 1/1976 | Keck et al. | 65/18.2 |
| 4,155,733 | 5/1979 | Sandbank et al. | 65/3.12 |
| 4,217,027 | 8/1980 | MacChesney et al. | 65/3.12 X |

FOREIGN PATENT DOCUMENTS

| | | |
|---|---|---|
| 22-45374 | 3/1973 | Fed. Rep. of Germany . |
| 48-5975 | 2/1973 | Japan . |
| 55-2263 | 1/1980 | Japan . |

OTHER PUBLICATIONS

Matsuo, "Selective Etching . . . by CBrF$_3$ Plasma", Appl. Phys. Letters, vol. 36, No. 9, May 1, 1980, pp. 768–770.

Encyclopedia of Chemical Technology, (Wiley-Interscience), 3rd edition, (1980), vol. 10, pp. 136–142.

Chow et al., "Phosphorous Concentration of CVD Phosphosilicate Glass", J. Electrochem., vol. 124, No. 7, (Jul. 1977), pp. 1133–1136.

Primary Examiner—Richard V. Fisher
Attorney, Agent, or Firm—Spencer & Frank

[57] ABSTRACT

Halides of Si and Ti, B, P, or Ge and oxygen or steam are introduced into a reaction vessel and heated in a vapor phase to form fine glass particles by oxidation or hydrolysis. The fine glass particles are deposited on a substrate. The deposited fine glass particles are heated and vitrified into a transparent glass layer, which is etched to form a core having a desired pattern by a reactive sputter etching process using Freon gas. The core is coated by a clad. In a waveguide thus formed, the cross sectional configuration and dimensions of the core layer and the refractive index difference are precisely controlled. The waveguide is manufactured with good reproducibility. The fabrication method is suitable for mass production of waveguides. An expansion coefficient transient layer is provided between the core layer and the substrate to prevent a crack in the waveguide. The glass softening temperature of the cladding layer is set lower than that of the core layer, so that the cross sectional configuration and dimensions of the core layer is unchanged against the heat in the vitrification process of the cladding layer. The refractive index is reduced in the vicinity of the boundary between the core and clad to prevent the loss of light due to light scattering on the core side faces.

8 Claims, 39 Drawing Figures

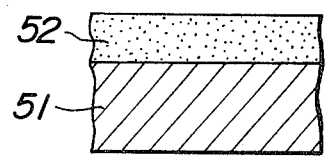
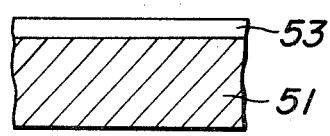
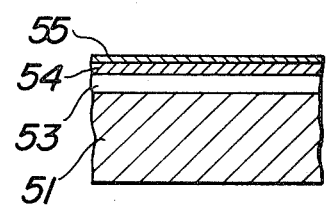
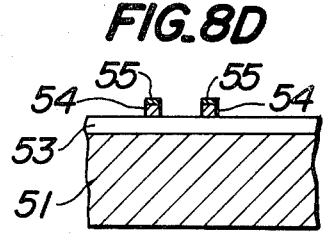
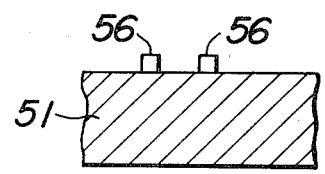
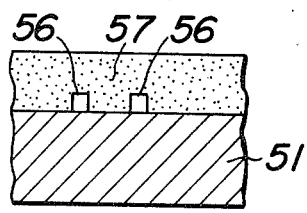
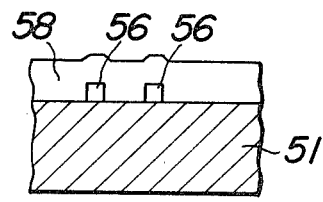

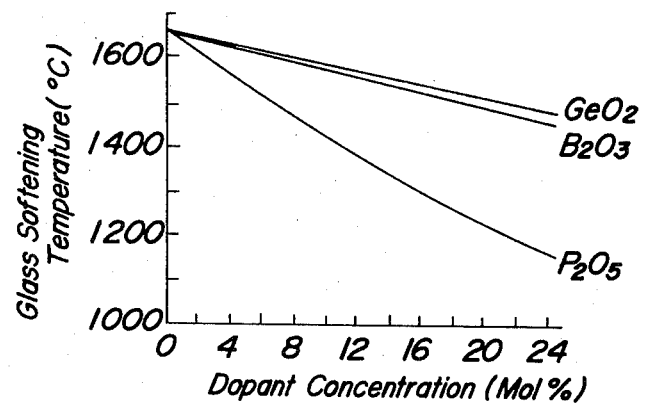
FIG_9
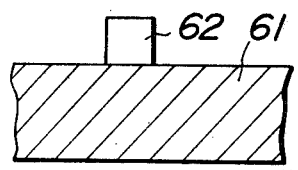
FIG_10A
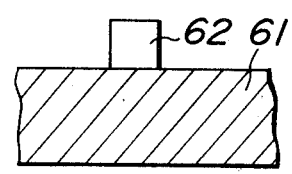
FIG_10B
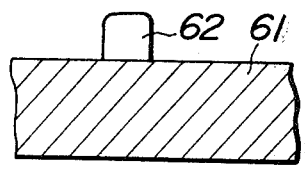
FIG_10C
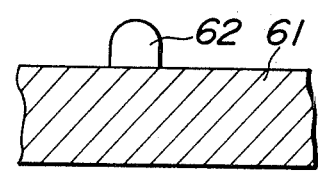
FIG_10D
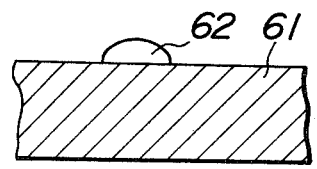
FIG_10E

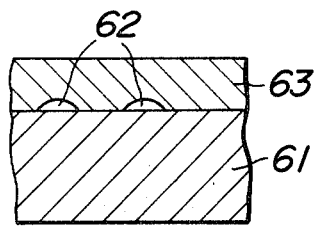
FIG_11
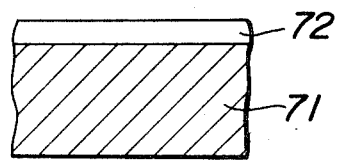
FIG_12A
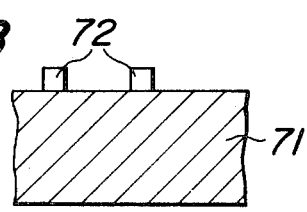
FIG_12B
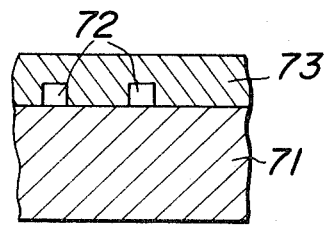
FIG_12C

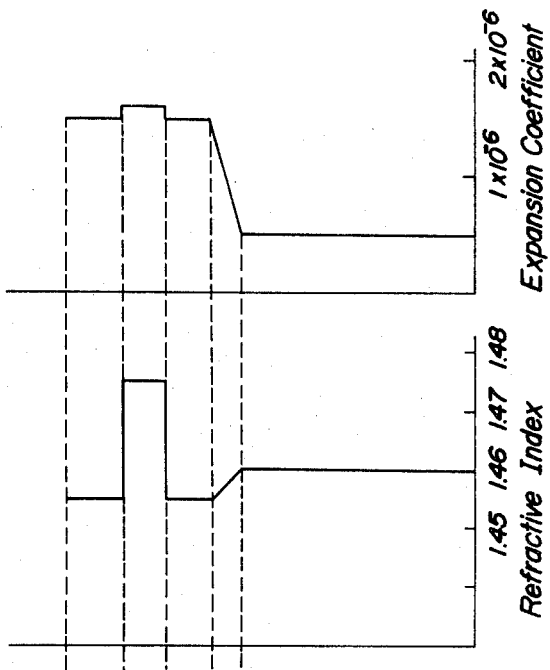

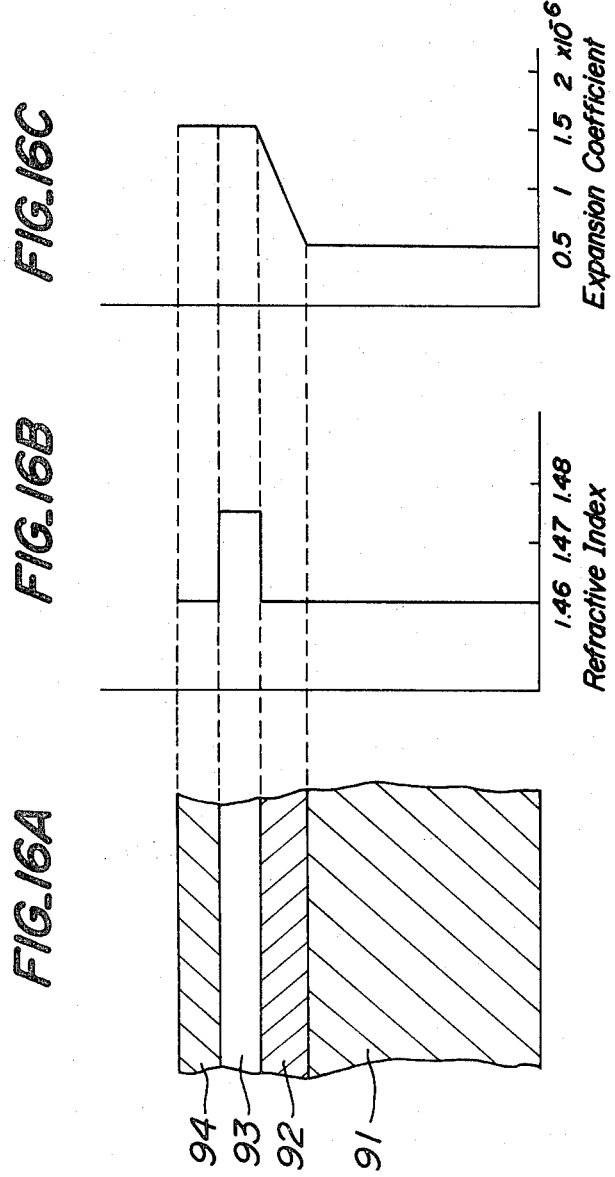

FIG_17A
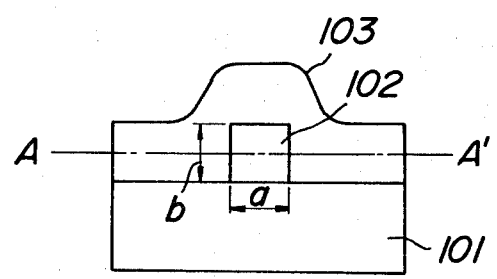
FIG_17B
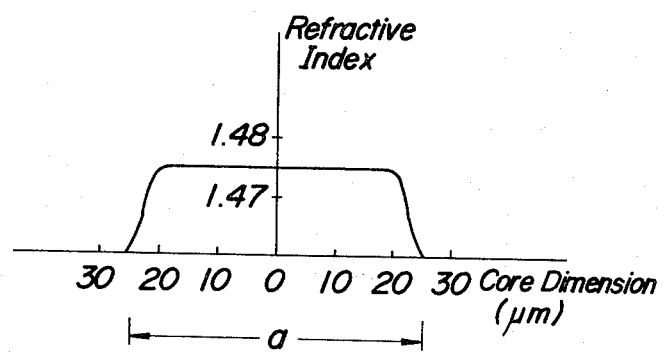

METHOD OF MAKING GLASS WAVEGUIDE FOR OPTICAL CIRCUIT

BACKGROUND OF THE INVENTION

The present invention relates to a glass waveguide for optical circuits and a method for fabricating such a waveguide.

In fabricating a glass waveguide for optical circuits, a core layer composed of a glass film is formed on a glass substrate by a sputtering process. The refractive index of the glass film is higher than that of the glass substrate. The core layer having a high refractive index is then etched into a desired pattern by a photolithographic method or the like. Finally, the pattern is coated by material having a lower refractive index. A light beam propagates through the waveguide thus formed, and is mainly concentrated in the core having the higher refractive index. Various methods have been proposed for fabricating this type of glass waveguide. The waveguide fabricated by any of these methods is a thin film having a thickness of approximately 1 $\mu$m or less, because of restrictions in the waveguide fabrication method. It has been desired to form a core having a thickness of 5 to 50 $\mu$m, in order to increase the efficiency with which connections can be made to optical fibers or other optical circuit elements and to realize a low loss waveguide. In addition, it is preferable that the core be coated with an upper cladding layer having a lower refractive index. Furthermore, it is necessary that the cross sectional configurations and dimensions of the waveguide be controlled in a precise manner in order to realize various functions thereof as an optical circuit element. It is not necessarily easy to fulfill all of these requirements. A particularly serious problem in realizing integrated optical circuit is that the core is deformed while forming the upper cladding layer following the formation of a core having a desired pattern.

When the core layer has a thickness of 1 $\mu$m or less, a difference between the expansion coefficients of the substrate material and the thin film material is out of the question. In the case of a glass waveguide for an optical circuit having a thick film glass in which the thickness of the core is 5 to 50 $\mu$m, a metal oxide such as $GeO_2$, $P_2O_5$, $TiO_2$ or the like is added to $SiO_2$ for the purpose of controlling the refractive index of the glass. The addition of the metal oxide changes the expansion coefficient of the glass. As a result, there is the possibility that the expansion coefficients of substrate glass made of, for example, silica ($SiO_2$) and a glass layer forming the waveguide will often change greatly. If the expansion coefficients differ between the substrate glass and the glass layer thereon, a distortion is produced due to a temperature change in the fabricating process of the waveguide. In an extreme case, the glass layer may be broken down. Even if the glass layer is not broken down in the fabricating stage, a slight weight applied to a waveguide formed under such conditions may damage the waveguide while it is in use. Thus, the waveguide is unstable.

Because of these problems, no practically usable waveguides for optical circuits have yet been developed. Optical fibers, prisms, lenses, mirrors and the like are still used as components for the formation of optical circuits.

U.S. Pat. No. 3,806,223 by Donald B. Keck et al., entitled "Planar Optical Waveguide" and U.S. Pat. No. 3,934,061 by the same inventors, entitled "Method of Forming Planar Optical Waveguides", disclose how to fabricate waveguides of relatively high quality. A waveguide manufactured by the method disclosed in these Keck et al patents, however, still involves a disadvantage in that the dimensions of the waveguide core, the configuration of the core cross section and the expansion coefficient difference are not controlled precisely. More specifically, in the Keck et al method, fine glass particles are formed by flame-hydrolyzing raw material, such as $SiCl_4$ or $GeCl_4$. Flame hydrolyzing is carried out by means of a reaction burner, for example, an oxy-hydrogen burner, and the fine glass particles are deposited on a glass substrate. Then, a portion of the fine glass particles located where a waveguide core is to be formed is vitrified into a core of transparent glass by irradiating the fine glass particles with a $CO_2$ gas laser. In the next step, the non-irradiated portion of the fine glass particles is removed. Subsequently, a second portion of fine glass particles is deposited on the core and the substrate, and then is vitrified into a transparent glass to form a cladding layer. In the core formation step, the reactive burner may be moved along a desired pattern to deposite fine glass particles locally, which is then vitrified into a transparent glass, as disclosed in U.S. Pat. No. 3,806,223.

In these methods, the fine glass particles, flame-hydrolyzed by moving the substrate relative to the burner, are progressively deposited. Therefore, fluctuations of the flame and a minute change in the flow the rate of oxy-hydrogen gas cause a change of thickness and composition of the fine glass particles deposited on the substrate. This makes it difficult to form an optical waveguide having uniform characteristics. There has also been proposed the vitrification by the laser or the local deposition of the core layer for the purpose of patterning the core layer.

It is, however, difficult to precisely control dimensions such as the height and width of the waveguide, which are important parameters of the waveguide. Particularly, it is impossible to fabricate a waveguide of which the width and height must be 5 to 10 $\mu$m, such as a single mode waveguide. The indefinite shape of the core cross section raises a serious problem from the viewpoint of making a connection between waveguides or between a waveguide and an optical fiber.

In order to improve the Keck et al method, the present inventors have previously proposed in Japanese patent application No. 75036/1978 (document 55-02263, dated Jan. 9, 1980) a new method of forming a glass layer, in which the refractive index and the thickness are carefully controlled, on a substrate. In this method, in order to form a uniform glass layer, a substrate placed in a reaction vessel is maintained at a high temperature of 1200° C. to 1650° C. Under this condition, glass raw material such as $SiCl_4$ or $GeCl_4$, together with oxygen, is introduced into the vessel where the glass raw material is thermal-oxidized into glass oxide to form a transparent glass layer on the substrate. This method enables a uniform glass layer to be formed over the entire surface of the substrate. In this method, however, the optimum temperature of the oxidation reaction of the glass raw material is different from the optimum temperature at which the synthesized glass is deposited on the substrate in a transparent state. Accordingly, the temperature range which satisfies both of the requirements is narrow. If the temperature deviates from the optimum temperature range, the refractive index and the thickness of the glass layer change. In this respect, it is not necessarily easy to form a uniform glass layer with good reproducibility. In addition, it is extremely difficult using this method to form optical waveguides having a high refractive index difference by adding additives having a high vapor pressure at a high temperature such as $GeO_2$ or $P_2O_5$. Accordingly, it is not possible to form a glass layer having a refractive index which is higher by 0.5% or more than that of pure silica glass.

In forming an optical waveguide, some suitable dopant(s) is(are) added to the core layer in order to control its refractive index. As a result, the softening temperature of the core layer is lowered, so that the core layer is deformed by heat application when an upper cladding layer is deposited onto the core layer. The deformation makes it difficult to control the configuration of the cross section and the dimensions of the core layer. Accordingly, it has been almost impossible to form a glass waveguide having characteristics, such as the propagation constant, which are within a given tolerance.

Usually, an optical waveguide is so designed that there is a refractive index difference of 0.2 and 3% between a core layer and its surrounding part. Because of this, the maximum expansion coefficient difference between the core layer and the silica glass substrate reaches $3 \times 10^{-6}$. As a result, the glass layer for the core easily cracks and is apt to be broken. In this respect, it has been desired to fabricate a glass waveguide for an optical circuit which is stable with respect to temperature change.

In a conventional optical waveguide as mentioned above, an irregular boundary itself at the side of the core, which is produced in the fabricating stage of the core layer, serves as a boundary of the waveguide. Accordingly, there is the disadvantage that the scattering loss of the guided light is large, i.e., a waveguide with a low loss cannot be obtained.

There has also been proposed an embedded type glass waveguide in which ions for increasing the refractive index are diffused into glass, as disclosed in Japanese Patent Application Publication No. 5975/1973 (document 48-05975, dated Feb. 21, 1973). In this waveguide, a core layer is formed by diffusing ions, so that the boundary surface of the waveguide is not irregular and a waveguide with a low scattering loss is obtained. However, the waveguide formed by this proposal has the following drawbacks:

(1) This method employs a diffusion phenomenon, so that it is difficult to control precisely the dimensions of the waveguide. This makes it difficult to fabricate a single mode waveguide requiring a core dimension of about 10 $\mu$m.

(2) It is difficult to obtain a fixed cross sectional configuration of the waveguide and therefrom to form a cross section with a desired shape such as a circle or rectangle.

SUMMARY OF THE INVENTION

Accordingly, an object of the present invention is to provide a glass waveguide for an optical circuit in which the cross sectional shape, dimensions and refractive index difference are precisely controlled.

Another object of the present invention is to provide a compact glass waveguide for an optical circuit which operates stably against a temperature change.

Still another object of the present invention is to provide a glass waveguide for an optical circuit having a low loss and reduced light scattering at the boundary side face of the waveguide.

Yet another object of the present invention is to provide a method of fabricating a glass waveguide for an optical circuit with a low loss in which the above-mentioned disadvantages are removed, the glass waveguide is fabricated with good reproducibility and the refractive index is controlled uniformly and precisely.

A further object of the present invention is to provide a method of fabricating a fine glass particle layer for a glass waveguide for an optical circuit, which is suitable for mass production.

According to the fabrication method of the present invention, wherein a glass waveguide for an optical circuit is formed by laminating glass layers having different refractive indexes on a substrate, halides of Si and Ti, B, P or Ge, together with oxygen or steam, are introduced into a reaction vessel and are heated in a vapor phase to be thermal-oxidized or hydrolyzed so as to form fine glass particles. The fine glass particles are deposited on a substrate placed in the reaction vessel, and finally the fine glass particles thus deposited are heated and vitrified into a transparent glass layer.

In the case of thermal oxidation, the temperature of the substrate is preferably within a range from 900° C. to 1200° C. The temperature gradient in the area where the substrate is placed in the vessel is preferable within a range from 1° C./cm to 20° C./cm with respect to the direction of oxygen flow introduced into the vessel.

In the case of hydrolysis reaction, the temperature of the substrate is preferably within a range from 600° C. to 1100° C. The temperature gradient in the area where the substrate is placed in the reaction vessel is preferably within a range from 1° C./cm to 20° C./cm with respect to the direction of the oxygen flow introduced into the reaction vessel.

In a preferred embodiment of the present invention, the reaction vessel includes a reacting section where introduced halide and oxygen or steam are thermal-oxidized or hydrolyzed to form the fine glass particles and a depositing section for accommodating at least one substrate onto which fine glass particles are to be deposited.

Here, the substrate may be made of silica glass or ceramic material.

In another preferred embodiment, a transparent glass layer is etched into a waveguide with a desired pattern by a reactive sputter etching method using Freon gas.

According to one aspect of the glass waveguide for an optical circuit of the present invention, in a glass waveguide for an optical circuit wherein glass layers having different refractive indexes are successively laminated on a substrate, the glass softening temperatures of the successively laminated glass layers gradually decrease from the substrate toward the uppermost glass layer.

Here, the layers may be a core layer formed on the substrate and a cladding layer formed on the core layer.

In a preferred embodiment of the present invention, a core layer in the form of a $GeO_2$-$SiO_2$ glass layer is formed on a substrate. After the core layer is processed into a waveguide with a desired pattern, $SiO_2$ glass containing $P_2O_5$ and $B_2O_3$ of which the amounts are substantially equal to each other is deposited as a cladding layer of a lower glass softening temperature to cover the core in a manner that the total amount of $P_2O_5$ and $B_2O_3$ contained in the $SiO_2$ glass is changed to control the glass softening temperature without changing the refractive index of the $P_2O_5$-$B_2O_3$-$SiO_2$ glass. The core layer is coated with the cladding layer.

According to a second aspect of the glass waveguide for an optical circuit of the present invention, a glass layer is inserted between the substrate and core layer and the expansion coefficient of the glass layer gradually changes from that of the substrate to that of the core layer.

The glass layer may be made of $SiO_2$ glass containing $P_2O_5$ and $B_2O_3$ in which the amounts of $P_2O_5$ and $B_2O_3$ are substantially equal to each other and the total amount of the added $P_2O_5$ and $B_2O_3$ gradually changes between the substrate and the core layer. Alternatively, it is preferable to form the lower cladding layer, the glass layer, the core layer and the upper cladding layer on the substrate in this order.

In a third aspect of the glass waveguide according to the present invention, a glass layer with a high refractive index and containing $SiO_2$ as a major component is deposited on a substrate. The glass layer is etched to form a core having a desired waveguide pattern and the core is coated by a glass layer with a low refractive index containing $SiO_2$ as a major component to form a clad, wherein the refractive index of the core is descreased in the vicinity of the boundary between the core and the clad.

Preferably, the additive added to the core glass for increasing the refractive index thereof is volatilized from the core after the core is formed, so that the refractive index in the vicinity of the boundary between the core and the clad is decreased. Alternatively, after the formation of the core, an additive for decreasing the refractive index of the core may be diffused into the exposed surface of the core.

The additive for increasing the refractive index of the core glass may be an oxide such as $GeO_2$, $P_2O_5$, $TiO_2$ or the like and the additive for decreasing the refractive index of the core may be $B_2O_3$, F or the like.

BRIEF DESCRIPTION OF THE DRAWINGS

FIGS. 8A to 8G are cross sectional views illustrating the sequence of steps of the method of fabricating a glass waveguide for an optical circuit according to the present invention;

FIG. 9 is a characteristic curve illustrating the relationship between the glass softening temperature and dopant concentration;

FIGS. 10A to 10E are cross sectional views illustrating various heated conditions of a core layer;

FIG. 11 is an explanatory diagram illustrating the deformation in cross sectional configuration of the core layer;

FIGS. 12A to 12C are cross sectional views illustrating the sequence of steps of the method of fabricating a glass waveguide for an optical circuit in which the softening temperatures of glass layers multi-layered on a substrate are arranged to be successively decreased from the substrate toward the upper glass layer;

FIGS. 15A and 16A are partial cross sectional views showing two embodiments of a glass waveguide according to the present invention in which a transient layer is provided for adjusting expansion coefficients, respectively;

FIG. 15B and 16B are graphs illustrating the distributions of refractive indexes in response to FIGS. 15A and 16A, respectively;

FIGS. 15C and 16C are graphs illustrating the distributions of expansion coefficients in response to FIGS. 15A and 16A, respectively;

FIG. 17A is a cross sectional view showing a further embodiment of a glass waveguide for an optical circuit according to the invention, in which the refractive index of a core is reduced in the vicinity of the boundary between the core and the clad;

FIG. 17B is a graph illustrating the distribution of the refractive index in the core.

DETAILED DESCRIPTION OF THE PREFERRED EMBODIMENTS

In the present invention, a glass layer for forming a core is deposited on a heat resistive substrate such as a silica glass substrate or a ceramic substrate directly or with the interposition of a transient layer for adjusting the expansion coefficient. The formation of the glass layer will first be described. In forming the glass layer, fine glass particles must be deposited on the substrate or the transition layer with good uniformity and reproducibility.

Figure 1:
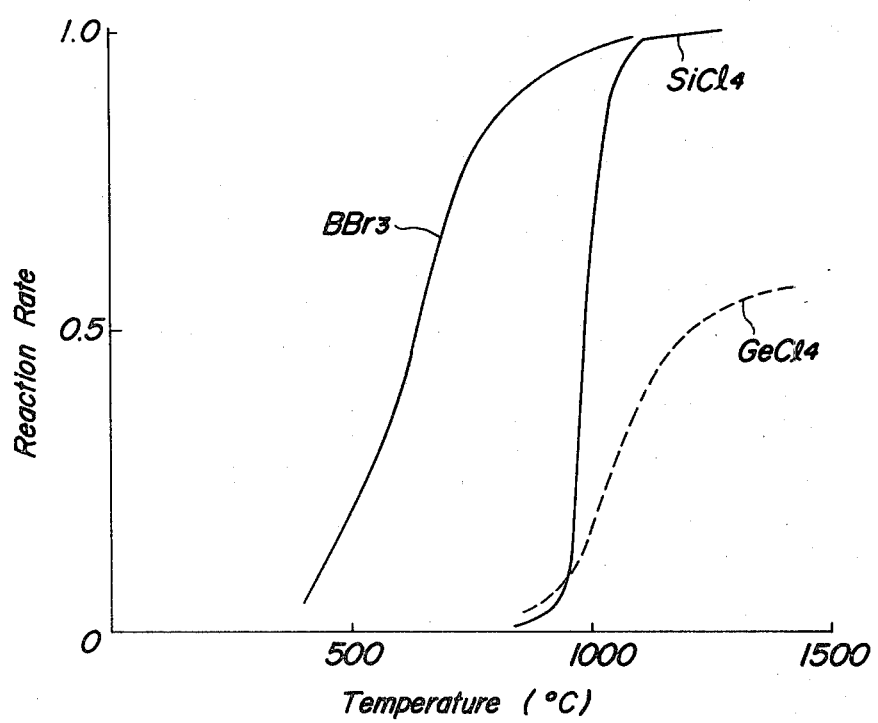
FIG. 1 is a characteristic curve illustrating the temperature-dependency of a gaseous oxidation reaction in various halides.

The glass raw material used here is halides of Si and Ge, Ti, P or B such as $SiCl_4$ as a major raw material and $GeCl_4$, $TiCl_4$, $POCl_3$ or $BCl_3$ as an additive for adjusting the refractive index, softening temperature and expansion coefficient. The relationship of the reaction rate of a gaseous phase thermal oxidation reaction with temperature is illustrated in FIG. 1, when the halides are heated together with oxygen. As seen from the graph, the halides other than $GeCl_4$ have approximately 100% of the reaction rate when the heating temperature is equal to or more than 1,000° C.

In the glass to which oxide having a high vapor pressure at a high temperature such as $GeO_2$ or $P_2O_5$ is added, the oxide is easily volatilized when the glass is synthesized at a high temperature, so that it is difficult to keep the composition of the glass with a high reproducibility. For this reason, fine glass particles synthesized in an oxy-hydrogen flame are deposited on a substrate at a low temperature in such a manner that the substrate is moved relative to a section for forming fine glass particles in order to obtain a uniform deposition of the fine glass particles. According to this method, however, practical difficulties are encountered in uniformly depositing the fine glass particles over a broad area. In this respect, this method is not suitable for fabricating a glass waveguide requiring a uniform deposition of the fine glass particles on the plane of the substrate.

For vitrification, a fine glass particle layer is subjected to a high temperature treatment at 1,300° C. or more after it is deposited. In this case, in order to avoid a residue of bubbles in the vitrification and from a viewpoint of handling, it is desirable to deposit the fine glass particles in a relatively sintered state. It was found by out experiment, of which the results are shown in Table 1, that when the temperature of the substrate is within a range from 800 to 1,200° C., a sufficiently hard layer was deposited. Further, the synthesizing reaction in the experiment was only the oxidization reaction.

TABLE 1

| Substrate Temperature | Sintering degree of deposited fine glass particles |
|---|---|
| 800° C. or less | Soft |
| 800 to 1,200° C. | Hard |
| 1,200° C. or more | Semi-vitrification |

In forming the fine glass particle layer, the above-mentioned halides, together with oxygen or steam, are introduced into a reaction vessel. They are then heated in a gaseous phase to form fine glass particles by the oxidation or the hydrolysis reaction and finally gas contaning the fine glass particles is flowed onto the substrate. The results of various experiments showed that when the temperature of such gas was equal to that of the substrate, the deposition of the fine glass particles was impeded, and that the glass particles were well deposited when there is provided a temperature gradient along the flow of the gas. It was found that the temperature gradient within a range from 1° C./cm to 20° C./cm ensured the uniform deposition and the degree of sintering of the fine glass particles as shown in Table 1. In the experiment, when several to ten substrates were disposed along the flow direction of the gas, the fine glass particles were uniformly deposited on these substrates concurrently.

Figure 2:
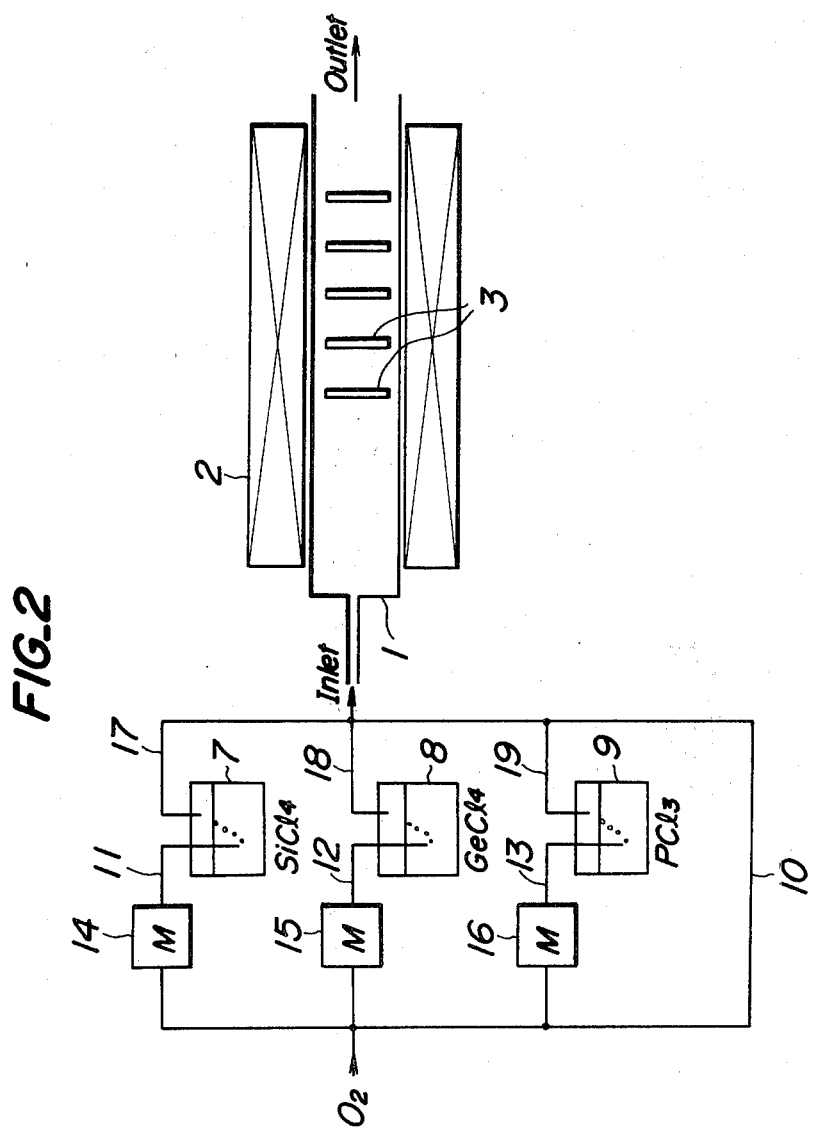
FIG. 2 is a schematic diagram showing an embodiment of an apparatus for forming a glass layer used in a glass waveguide for an optical circuit according to the present invention.
Figure 3:
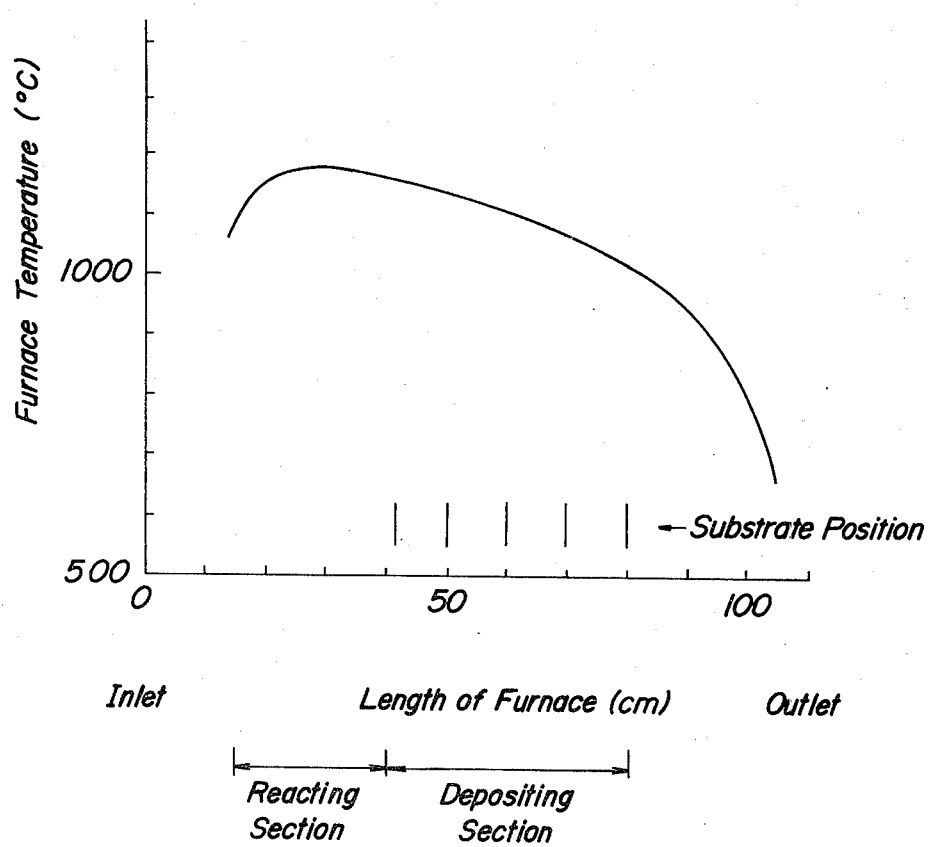
FIG. 3 is a temperature profile in a furnace of the apparatus for forming the glass layer shown in FIG. 2.

An embodiment for fabricating the fine glass particles layer according to the present invention will be described. In this embodiment, the apparatus shown in FIG. 2 was used. In FIG. 2, reference numeral 1 designates a silica tube with an inner diameter of 80 mm and a length of 1.1 m, 2 a furnace for heating the silica tube 1, which is disposed around the silica tube 1, 3 square silica substrates of which each side is 50 mm, 4, 5 and 6 $SiCl_4$, $GeCl_4$ and $PCl_3$ reserved in saturators 7, 8 and 9, respectively, 10 a bypass passage for oxygen gas or steam, 11, 12 and 13 passages for supplying oxygen gas or steam through mass flow controllers 14, 15 and 16 to the saturators 7, 8 and 9, respectively, and 17, 18 and 19 passages for introducing oxygen gas containing the glass raw material into the silica tube 1. In operation, the electric furnace 2 was powered on and the electric power was controlled so that the silica tube 1 has a temperature profile as shown in FIG. 3. The temperature gradient was set to be 3° C./cm at the substrate position. In the silica tube 1, a reacting section was formed over 15 to 40 cm from the inlet of the tube and a depositing section was formed further over 40 to 80 cm, in which five substrates 3 were disposed at an interval of 10 cm. Oxygen gas of 400 cc/min was blown into the saturators 7, 8 and 9, which are respectively kept at 20° C., 15° C. and 10° C., through the passages 11, 12 and 13, respectively. The oxygen gases are saturated with the vapor of the raw materials. The oxygen gas containing the raw material, together with oxygen gas of 1000 cc/min supplied from the bypass passage 10, is led into the silica tube 1. This condition of the silica tube 1 filled with the oxygen gas and the raw material is kept for 60 minutes. Under this condition, fine glass particles were formed only by the oxygen reaction and were disposed on the substrates 3. As a result, white fine glass particles were deposited on the five substrates 3. The fine glass particle layer was uniform in thickness on each substrate 3. The more the substrate was disposed on the downstream side of the silica tube 1, the thicker the thickness of the deposition was. The degree of the sintering of the glass particles was higher on the upstream side, since the temperature of the substrate was higher on the upstream side. When the respective substrates were placed in another furnace and heated to maintain the temperature of the furnace at 1,450° C. for about five minutes to vitrify the fine glass particle layer deposited on the substrate, the thickness of the layers thus obtained were 14 $\mu m \pm 1.5$ $\mu m$. While in this embodiment, the temperature gradient of the deposited portion was set to be 3° C./cm, the fine glass particles were hardly deposited on the five substrates 3, when the range of 30 to 90 cm from the inlet of the silica tube 1 was heated at 1,100° C. When the temperature gradient was set to be 14.5° C./cm, hard fine glass particles were uniformly deposited on the substrate 3 placed at a position where the temperature was 1,050° C. In this case, the temperature of the substrate which was placed at a position 10 cm downstream from the above-mentioned substrate was 905° C., so that the fine glass particles deposited on this substrate were soft and therefore the substrates disposed further downstream from this substrate were not available for a glass waveguide.

Figure 4:
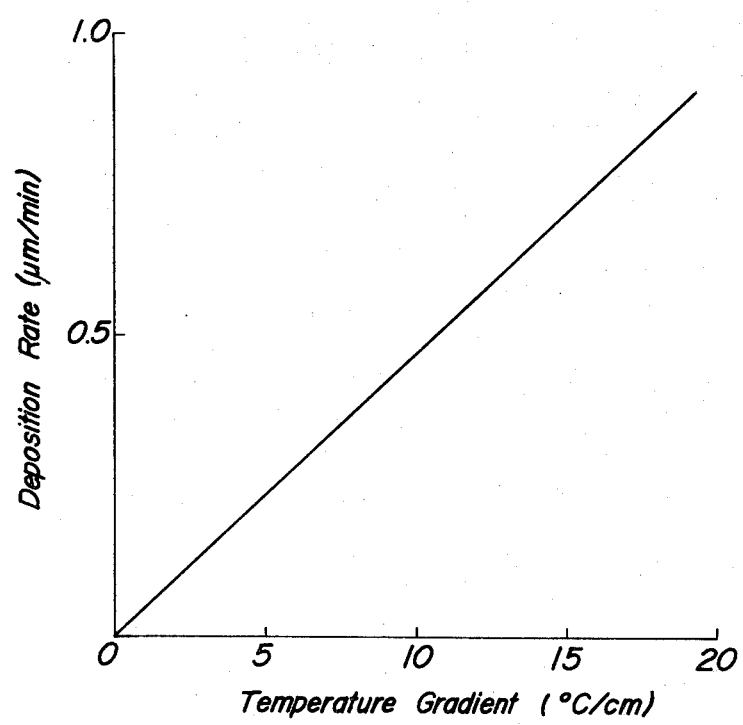
FIG. 4 is a characteristic curve illustraing the relationship between the deposition rate and temperature gradient.

FIG. 4 illustrates the relationship between temperature gradient (°C./cm) and deposition rate ($\mu m/min$) of the fine glass particles, which was obtained from the above-menioned embodiment and other experimental results. The characteristic curve indicates that the deposition rate is higher as the temperature gradient becomes steeper. In FIG. 4, the deposition rate is expressed in terms of the thickness of the glass layer after the glass particle layer is vitrified. In the region where the temperature gradient is less than 1° C./cm, the deposition rate is less than 0.1 $\mu m/min$, so that it takes a long time to fabricate a glass waveguide requiring a glass layer having a thickness of 10 $\mu m$ to 50 $\mu m$, and accordingly productivity of the glass waveguide is low. When the temperature gradient is 20° C./cm or more, the deposition rate is fast but the deposition condition is not stable against a variation of the gas flow rate, with the result that the fine glass particles are not uniformly deposited.

While in the embodiment shown in FIG. 2, the substrates 3 were disposed at a right angle to the flow of gas, the experiment furher showed that the substrates 3 in the silica tube 1 may be disposed horizontally or in an inclined manner.

With respect to the time for vitrification treatment, a preferable vitrification time was about 5 to 10 minutes, although the time slightly depends on the glass material used. If the time is shorter than that time, the vitrification treatment is insufficient. On the other hand, if the time is longer than that, the glass particles are in a boiling state, resulting in bubbling or evaporation of phosphorus, for example. The vitrification treatment time is preferably 90 to 120 minutes including the time for temperature rise and temperature fall.

Figure 5:
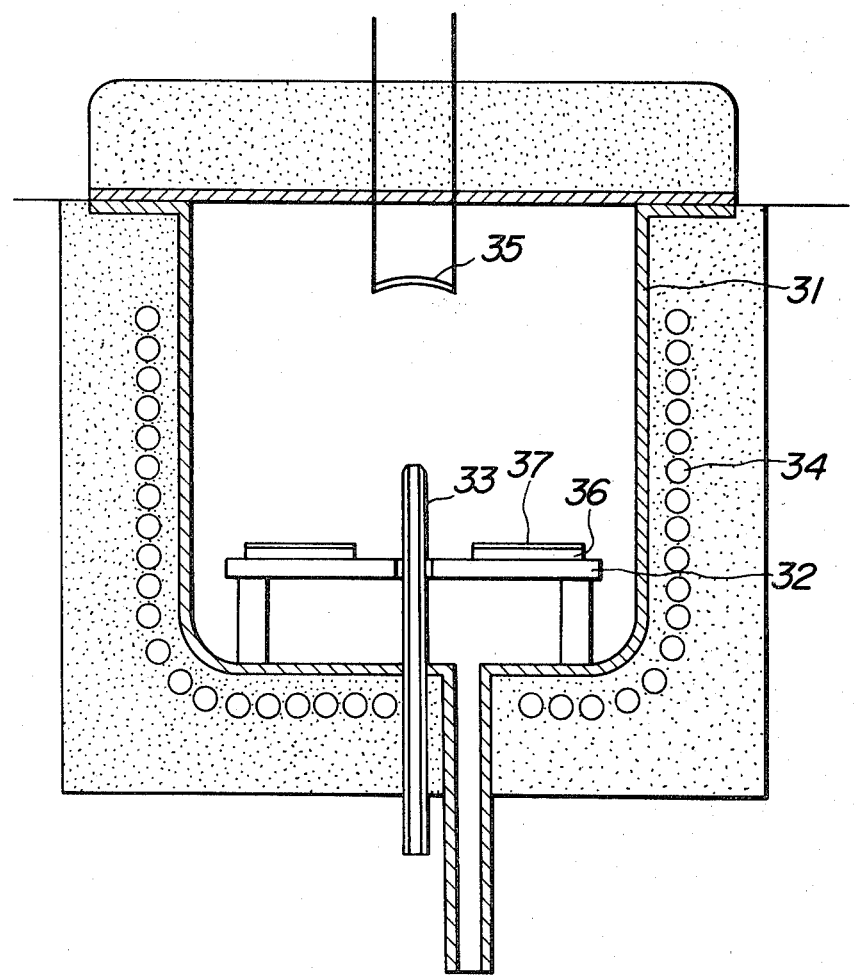
FIG. 5 is a schematic diagram showing another embodiment of an apparatus for forming the glass layer in a glass waveguide for an optical circuit according to the present invention.
Figure 6:
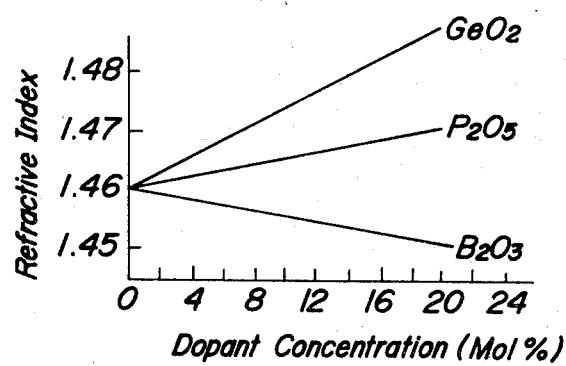
FIG. 6 is a characteristic curve illustrating the relationship between dopant concentration and refractive index.

Turning now to FIG. 5, there is shown another embodiment of a reaction apparatus for depositing fine glass particles on the substrate according to the present invention. In FIG. 5, the reaction apparatus includes a reaction vessel 31 made of refractory material such as silica glass, a substrate table 32, a raw material gas blowing nozzle 33, a substrate heater 34 and a raw material gas heater 35. Reference numeral 36 designates a substrate for a waveguide for an optical circuit. The substrate 36 is a planar plate of a transparent silica glass with a thickness of 1 to 5 mm and the surface of the plate is abraded smoothly. The substrate 36 is fixed on the substrate table 32 and is heated at about 600° to 1100° C. by the substrate heater 34. Fine glass particle material, together with oxygen or steam, is led into the reaction vessel 31 through the raw material gas blowing nozzle 33. The composition of the glass particle raw material is determined by the amounts of additives in the glass to by synthesized, particularly by the refractive index difference. In this case, the refractive index difference is preferably 0.2 to 3%. Here, the relationship between the amounts of the additives and refractive index is illustrated in FIG. 6.

The gas introduced into the reaction vessel 31 is heated at 1,000° to 1,300° C. by the raw material gas heater 35 made of platinum or the like, so that there occurs an oxidization or hydrolysis reaction to form into fine oxidation glass particles such as $SiO_2$, $GeO_2$, $B_2O_3$, $P_2O_5$, $TiO_2$ or the like. Incidentally, when oxygen is added to the raw material, oxidation takes plce at 1,000° C. or more. When steam is added to the raw material, the hydrolysis takes place at 800° C. or more. In this case, if the temperature is at 1,200° C. or more, a sufficient reaction rate is obtained. The fine glass particles formed through such reaction are uniformly deposited on the substrate 36 within the reaction vessel 31. The density of the fine glass particles 37 deposited on the substrate 36 depends on the substrate temperature. The density of the glass particles 37 deposited on the substrate 36 is determined by the substrate temperature. If the substrate temperature is 600° C. or less, the adhesion among the particles and of the particles to the substrate are weak, so that the particle layer easily deforms or peels off. In the substrate temperature ranges from 600° C. to 1,100° C., the density of the glass particles is 1/10 to 1/15 that of a transparent glass and the adhesion of the particles to the substrate 36 is strong. Even the oxide with high vapor pressure such as $GeO_2$ may stably be added into the glass particles. Particularly if the substrate temperature ranges from 800° to 1,100° C., the glass particle was most stable. The glass particles 37 deposited on the substrate 36 are vitrified into a transparent glass layer when the glass particle is heated at 1,300° to 1,600° C. Incidentally, the heating temperature range slightly depends on the material used and the most preferable temperature range was 1,400° to 1,500° C.

Figure 7:
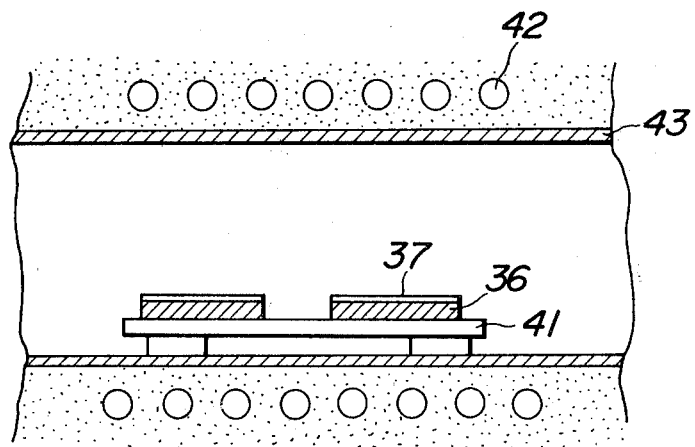
FIG. 7 is a cross sectional view showing an embodiment of a vitrification heater used in the present invention.

FIG. 7 illustrates a cross sectional view of an apparatus for vitrifying the fine glass particle layer 37 into a transparent glass layer. The substrate 36 with the fine glass particle layer 37 deposited thereon is fixed on the substrate table 41 having a smoothed surface and made of refractory material such as graphite, zirconia or the like. Under this condition, the layer 37 is heated by the heater 42. The material of the substrate table 41 should be high purity refractory material which is not deformed at a high temperature, in oder to avoid the deformation of the substrate 36. In the Figure, reference numeral 43 designates a furnace tube.

For patterning the core portion which is vitrified as mentioned above, the unnecessary portions are removed by the following process. In the case of a plane waveguide requiring no pattern, a $SiO_2$ glass layer or a $SiO_2$ glass layer with $P_2O_5$ or $B_2O_3$ as an additive is formed as a coating layer in a similar manner.

In order to remove unnecessary portions of the core glass layer, a metal having an etching rate which is slower than glass in a Freon gas plasma, such as Si, Ti or Mo, is cladded in the thickness of 1 to 5 $\mu m$ on the core glass layer by evaporation, sputtering or the CVD method. Then, the thick metal film is etched in a $CBrF_3$ gas plasma with a mask of a resist having a desired pattern formed by the conventional photolithography technique, so as to make the processed face of the thick film substantially perpendicular to the substrate surface. By using the etched thick film as a mask, the core glass layer is etched in a Freon gas plasma by the reactive sputter etching process to form a core portion having a substantially rectangular cross section. That is to say, when the substrate is placed in the $C_2F_6$ plasma, the metal layer such as a Si layer and the glass layer are etched at a speed ratio of 1 to 15 and the glass layer is etched at a rate of about 0.1 $\mu m$ per minute. The residual metal film is removed by the plasma etching process using a $CF_4$ gas.

Alternatively, a $SiO_2$ layer of 0.2 to 0.7 $\mu m$ in thickness is deposited on the metal thick film by the RF sputtering process and is photoetched into a desired pattern by conventional photolithography and the patterened film may be used as the mask in place of the resist as used in the above-mentioned case. Then, the metal film is etched in the $CBrF_3$ gas plasma, so that the etched film may be used as a mask for the core glass layer. This method of processing the metal thick film was developed by Seitaro Matsuo, and is discussed in detail in "Selective etching of Si relative to $SiO_2$ without undercutting by $CBrF_3$ plasma" on page 100 of a national conference book of Semiconductor and material group of the Institute of Electronics and Communication Engineers of Japan, 1979. The proposal is also described on pp. 768–770, Appl. Phys. Lett. 36(9), 1 May 1980 by the same author.

In general, the core portion is coated by glass having a low refractive index to reduce the optical transmitting loss. For this purpose, use is made of a reaction apparatus which is the same as that used for forming the core glass layer, and $SiCl_4$ or $BBr_3$ is used as raw material for forming fine glass particles which are deposited, heated and vitrified. In this case, a small amount of $POCl_3$ may be added to the raw material in order to lower the softening temperaure of the glass layer.

An example of a method of fabricating a glass waveguide for an optical circuit according to the present invention by using the apparatus shown in FIG. 5 will be described in detail.

Silica plates 36 of 50 mm square and having a thickness of 3 mm and a surface which is smoothly abraded are placed in the reaction vessel 31 shown in FIG. 5 and are fixed on the substrate supporting table 32. Under this condition, the silica plates 36 are heated at 1,000° C. while $SiCl_4$ and $GeCl_4$ in the saturators are kept at the saturator temperature 20° C. and 20° C. (or 20° C. and 15° C.), respectively and oxygen gas is blown into the saturators containing the $SiCl_4$ and $GeCl_4$ gases at the rates of 130 cc/min and 150 cc/min (or 150 cc/min and 210 cc/min), to saturate the oxygen gas with $SiCl_4$ and $GeCl_4$. The saturated gases are led to the nozzle 33 mounted in the reaction vessel 31. Under this condition, the reaction heater 35 mounted on the upper portion of the reaction vessel 31 is then heated at 1,300° C. for 50 minutes (or 30 minutes). After the heating, the vessel 31 is cooled down and the substrates are taken out of the vessel 31. In this example, the temperature gradient in the vessel 31 was 50° C./cm. On the substrate 51 thus taken out was deposited a fine glass particle layer 52 of 0.5 mm in thickness, as shown in FIG. 8A. The depositing rate was 1 to 0.6 $\mu m/min$. The substrate 51 was fixed on the substrate table 41 made of graphite in the heating apparatus shown in FIG. 7, and was heated at 1,500° C. for three minutes. Then, the substrate 51 was cooled down. Through this process, a transparent glass layer of 50 $\mu m$ in thickness was formed on the substrate 51, as shown in FIG. 8B. Then, the substrates 51 were placed in the plasma CVD apparatus in which a mixture gas of $SiH_4$ and Ar gas is contained. Under this condition, the mixture gas was discharged to form a polysilicon layer 54 having a thickness of 6 $\mu m$ (or 5 $\mu m$). Then, a $SiO_2$ layer 55 of 1 $\mu m$ in thickness was formed on the silicon surface by thermal oxidation (FIG. 8C). The $SiO_2$ layer 55 was etched to form a desired pattern by the conventional photolithography process. The substrate 51 was put into a parallel plate type plasma etching apparatus and held in $CBrF_3$ gas plasma for 100 minutes. The pattern formed on the $SiO_2$ layer 55 is transferred onto the polysilicon layer 54. The result is as shown in FIG. 8D. At this time, the processed surface of the polysilicon layer 54 was substantially perpendicular to the surface of the substrate 51. Then, the substrate 51 was fixed to the (−) polarity of the parallel plate type plasma etching apparatus through a graphite plate and was held in the plasma of $C_2F_6$ gas containing a 2% concentration of $C_2H_4$ for 300 minutes. Then, the residual silicon was etched by a KOH solution. As a result, a core portion 56 having a planar configuration corresponding to the above-mentioned pattern and a rectangular or square cross sectional configuration was formed on the substrate 51, as shown in FIG. 8E. Then, the substrate 51 was placed in the reaction vessel 31, while $SiCl_4$, $BBr_3$ and $POCl_3$ were kept at 20° C., 20° C. and 10° C. (or 20° C., 5° C. and 20° C.), oxygen gas was supplied thereinto at rates of 130 cc, 100 cc and 50 cc per minute (or 150 cc, 150 cc and 150 cc per minute). Under a similar reaction condition, it was held for 100 minutes. As a result, a fine glass particle layer 57 was deposited, as shown in FIG. 8F and was then vitrified at 1,500° C. The result was that the substrate 51 and the core portion 56 were coated with a transparent glass layer 58 having a thickness of 100 $\mu m$. With this arrangement, the refractive index of the core portion 56 was higher by 1% than that of the coating layer 58, so that a waveguide in which the light ray is concentrated and guided in the core portion was fabricated. The loss of the waveguide was 0.01 dB/cm or less and the glass waveguide sufficiently serves as an optical circuit component.

As described above, according to the present invention, a temperature gradient is provided in a portion where fine glass particles are to be deposited on the substrate. The glass raw material gas is heated in the reaction vessel to form fine glass particles by oxidation or hydrolysis. The fine glass particles are deposited on the substrate and vitrified. Therefore, the fluctuation of the composition and thickness of the fabricated glass is little, unlike conventional method in which the fine glass particles formed by flame hydrolysis scan the substrate while being blown onto the substrate. Accordingly, an optical waveguide with a given dimension and a given refractive index may easily be made with good reproducibility and high precision.

It has been technically difficult to process the glass layer having a thickness of several $\mu m$ or more to remove an unnecessary portion therefrom in a manner such that the processed surface is substantially perpendicular to the substrate surface. In the present invention, this problem is solved by subjecting the glass layer to the reactive sputter etching by using silicon or the like formed in the $CBrF_3$ plasma as a mask. The present invention can be used to fabricate various types of waveguides each having a substantially rectangular or square cross section from a single mode waveguide having a width of several $\mu m$ to 10 $\mu m$ to a multi-mode waveguide of 50 $\mu m$ in width and thickness.

Further, in the embodiment shown in FIG. 2, a plurality of substrates are disposed along the flow direction of the gas flow and a temperature gradient is applied to these substrates. With this arrangement, uniform fine glass particles are deposited on the respective substrates concurrently. Accordingly, the fabricating method according to the present invention is suitable for mass production of glass waveguides.

In forming the cladding layer and the core layer in the above-described process for manufacturing a glass waveguide, it is necessary to the refractive indexes of the respective layers to predetermined refractive indexes. The refractive indexes of those layers change depending on the dopant concentrations of the products by oxidation such as $GeO_2$, $P_2O_5$, $B_2O_3$ or the like, as shown in FIG. 6. For example, a normal multi-mode waveguide needs a core glass layer having a refractive index approximately 1% larger than that of the pure $SiO_2$ glass. This core glass layer may be realized by a $SiO_2$-$GeO_2$ glass to which $GeO_2$ is added by an amount of approximately 10%. The refractive index of the upper cladding layer is preferably smaller than that of the core layer and generally equal to that of the pure $SiO_2$ glass. Accordingly, if the pure $SiO_2$ is used for the upper cladding layer, there arises no optical problem in particular. However, some dopant is added to the core layer for controlling the refractive index thereof, so that the glass softening temperature is lowered, as shown in FIG. 9. As a result, the core portion is deformed by heat at the time of forming the upper cladding layer. For example, when the core portion 62 is disposed on the silica substrate 61, as shown in FIG. 10A, showing that the core portion 62 is not heated, if the core portion 62 is heated at a temperature lower by 100° C. than the softening temperature, the core porltion 62 is not deformed as shown in FIG. 10B. When it is heated at a temperature lower by 50° C. than the softening temperature, the corners of the core portion 62 are slightly deformed, as shown in FIG. 10C. Further, when it is heated at the softening temperature, the surface of the core portion 62 is deformed so as to be round in cross section, as shown in FIG. 10D. When it is heated at a temperature higher by 50° C. than the softening temperature, the roundish deformation of the surface of the core portion 62 further progresses to expand outwardly, as shown in FIG. 10E. Accordingly, when the glass of which the softening temperature is higher than the core glass is used for an upper coating layer 63, the core portion 62 is deformed to be roundish in cross section, as shown in FIG. 11.

This problem may be solved by independently controlling the refractive index and the softening temperature of the glass. In view of this, according to the present invention, the glass layers are successively multi-layered on the substrate so that the glass softening temperatures of the glass layers are lowered, respectively, as the glass layers are disposed further from the substrate side. In this invention, a change of the refractive index of the glass layer due to the additive for controlling the softening temperature is compensated by another additive.

An embodiment of a waveguide with such a construction for an optical circuit according to the present invention will be described with reference to FIGS. 12A to 12C.

As shown in FIG. 12A, a $GeO_2$-$SiO_2$ glass layer 72 containing $GeO_2$ by an amount of 10% is deposited on a substrate 71 made of silica glass, with a thickness of 50 $\mu$m. Then, as shown in FIG. 12B, unnecessary portions are removed from the layer 72 in accordance with a desired pattern. Subsequently, a $P_2O_5$-$B_2O_3$-$SiO_2$ glass layer 73 containing $P_2O_5$ and $B_2O_3$ by amounts of 4% and 6%, respectively, is further deposited on the substrate bearing thereon the patterned layer 72, with a thickness of 100 $\mu$m, as shown in FIG. 12C. In the case of the $SiO_2$ glass containing substantially equal amounts of $P_2O_5$ and $B_2O_3$, its glass softening temperature may be controlled by changing the total amount of $P_2O_5$ and $B_2O_3$ without the change of refractive index. Therefore, the composition of the upper coating glass layer 73 having a lower softening temperature may be determined in accordance with the composition of the core.

As described above, in a waveguide for an optical circuit according to the present invention wherein glass layers are successively layered on the substrate, the softening temperatures of the glass layers are lowered as those are farther from the substrate. With this arrangement, the cross sectional configuration and dimensions of the core layer are precisely controlled and therefore those are stable in the sequence of fabrication steps. Therefore, a glass waveguide according to the present invention has characteristics such as propagation constants which are satisfactorily within a given tolerance.

Figure 13:
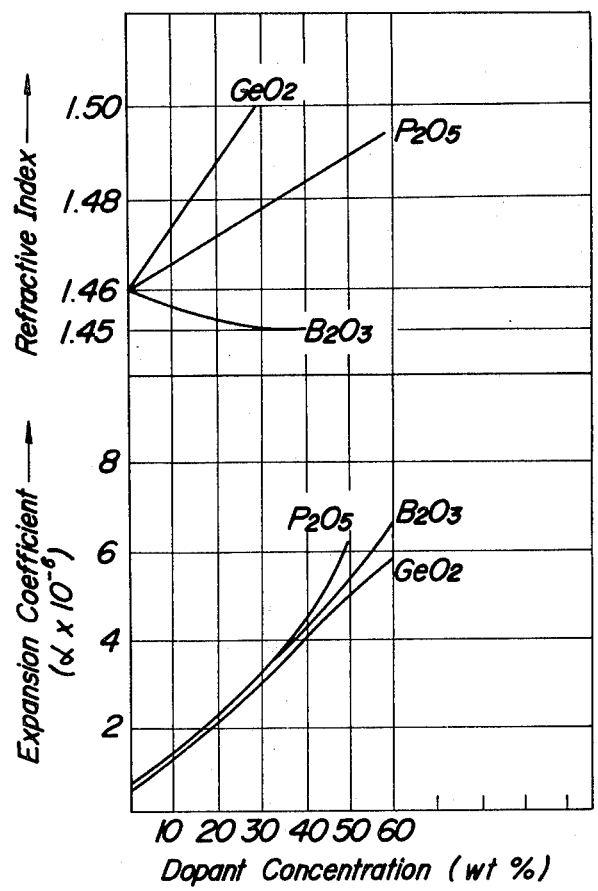
FIG. 13 is a characteristic curve illustrating the relationship between the refractive index and expansion coefficient with dopant concentration.

As described above, a dopant such as $GeO_2$ is added to $SiO_2$ as shown in FIG. 6 so that the refractive index of the core layer is larger than that of its adjacent layers. In the glass where a dopant such as $GeO_2$ is added to change the refractive index of the glass, its expansion coefficient also changes depending on the amount of the dopant, as shown in FIG. 13. Curves plotted in FIG. 13 are for $GeO_2$, $P_2O_5$ and $B_2O_3$ as dopants. In general, approximately 0.2 to 3% refractive index difference is employed between the core portion and its adjacent layers. For such refractive index difference, the graph of FIG. 13 provides an expansion coefficient difference of $3 \times 10^{-6}$ at the maximum between the core and the silica glass as the substrate. Accordingly, a crack is likely to be produced in the glass layer for the core so that the glass layer is fragile.

Figure 14:
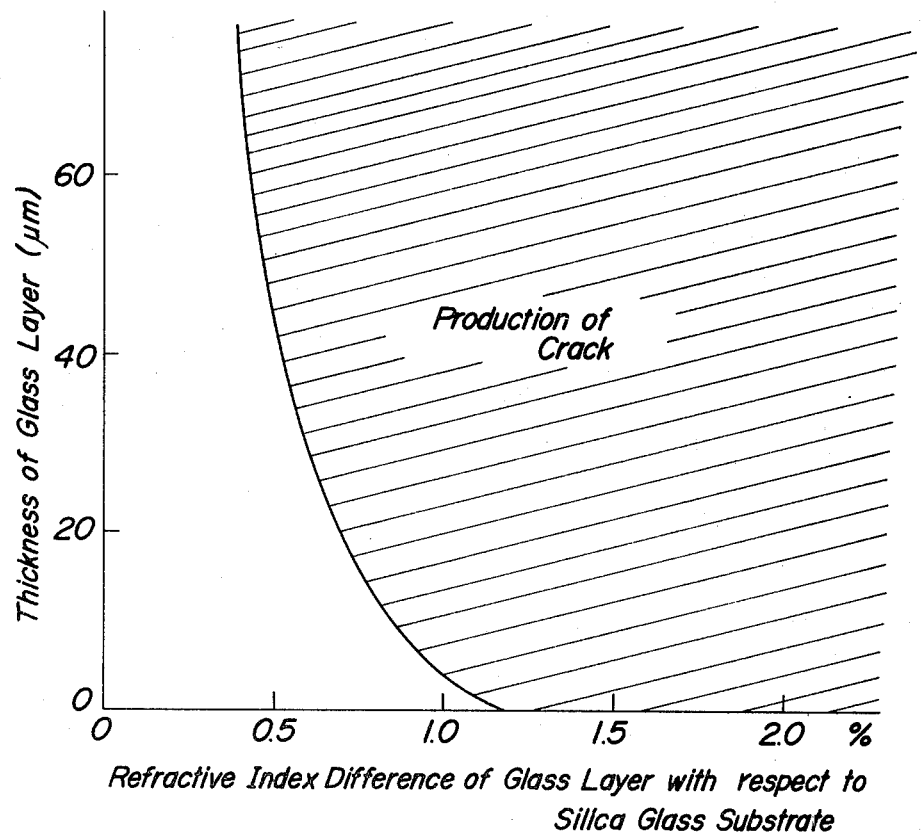
FIG. 14 is a characteristic curve explaining the occurrence of cracks.

In FIG. 14, in which the abscissa represents a refractive index difference between the $GeO_2$ added glass layer and the silica glass layer and the ordinate represents the thickness of the glass layer, there is shown a hatched area where a crack is produced. The graph shows that the crack is produced when a glass layer having a refractive index difference higher by 0.5% than that of the silica substrate is formed on the substrate.

In order to solve this crack problem, the present invention forms a transient region of expansion coefficient between the glass layer for the core and the substrate. Generally, when the expansion coefficient is changed, the refractive index also changes. Accordingly, if a transient region is directly formed between the core layer and the substrate, there arises a structural problem of the waveguide. For example, if the refractive index of the glass layer adjacent to the core layer is changed or larger than that of the core layer, the characteristic of the waveguide changes.

In view of this, the present invention employs a transient layer having an expansion coefficient ascending gradually from the substrate side toward the core layer side. This transient layer is deposited on the substrate and the core layer is deposited on the transient layer so as to adjust the expansion coefficient difference between the substrate and the core layer. An embodiment of the waveguide with such a construction will be explained with reference to FIGS. 15A to 15C. In this embodiment, a $B_2O_3$-$SIO_2$ glass layer 82 of about 20 $\mu$m in thickness is formed on a substrate 81. In the glass layer 82, the amount of $B_2O_3$ contained therein gradually increases from 0 to 10% in the direction of the thickness, or from the substrate side toward layers formed thereon. Then, a lower cladding layer 83 containing $B_2O_3$ by an amount of 10% is formed having a thickness of about 20 $\mu$m on the layer 82. A core layer 84 containing $GeO_2$ by 10% is further formed on the layer 83. Finally, an upper cladding layer 85 containing $B_2O_3$ by 12% and $P_2O_5$ by 2% is formed on the core layer 84. With this structure, an optical waveguide is constructed by the lower cladding layer 83, the core layer 84 and the upper cladding layer 85. Thus, the expansion coefficient transient layer 82 is formed between the substrate 81 and the waveguide section 83, 84 and 85. A refractive index distrubution and an expansion coefficient distribution of this waveguide are as illustrated in FIG. 15B and 15C. By providing the transient layer 82, the expansion coefficient gradually changes so that distortion which could be caused by the expansion coefficient difference is considerably reduced to eliminate damage to the waveguide. In order to ensure the prevention of the crack, it is sufficient that the thickness of the transient layer 82 is equal to or larger than that of the core layer 84.

FIG. 16 shows another embodiment of a waveguide according to the present invention. In this embodiment, the expansion coefficient transient layer and the lower cladding layer are integrated in fabricating the waveguide. As shown in FIG. 13, when approximately equal amounts of $P_2O_5$ and $B_2O_3$ are added to the $SiO_2$ glass, the changes of the refractive indexes by these additives are neutralized, so that the $SiO_2$ glass does not change its refractive index. On the other hand, the expansion coefficient of the SiO$_2$ glass increases in proportion to the amount of additives, regardless of the kind of additives. Accordingly, if the structure of the waveguide as shown in FIG. 16A is employed, the transient layer and the lower cladding layer may be integrated as a single layer. In FIG. 16A, in order to form a lower cladding layer 92, approximately equal amounts of P$_2$O$_5$ and B$_2$O$_3$ are added to SiO$_2$ glass and then the SiO$_2$ glass containing these additives is deposited as a SiO$_2$-P$_2$O$_5$-B$_2$O$_3$ glass layer on the substrate 91 with a thickness of about 20 μm while the total amount of the additives is gradually changed from 0 to 10%. Then, a core layer 93 is formed on the cladding layer 92 by depositing theron GeO$_2$-P$_2$O$_5$-B$_2$O$_3$-SiO$_2$ glass containing GeO$_2$ by 10% and P$_2$O$_5$ and B$_2$O$_3$ by the same amount as that of the lower cladding layer 92 with a thickness of about 50 μm. Subsequently, P$_2$O$_5$-B$_2$O$_3$-SiO$_2$ glass containing P$_2$O$_5$ by 6% and B$_2$O$_3$ by 8% is deposited on the core layer 93 with a thickness of about 50 μm to form an upper cladding layer 94. A refractive index distribution and an expansion coefficient distribution of the waveguide with such a structure are illustrated in FIGS. 16B and 16C. As seen from these distributions, the expansion coefficient gradually changes by using the lower cladding layer 92, so that distortion is greatly reduced.

While in the above-mentioned two embodiments, the expansion coefficient continuously changed, the expansion coefficient may be changed in any characteristic as long as if it is not abruptly changed between the substrates 81 and 91 and the core layers 84 and 93, respectively.

According to this invention, as described above, in a waveguide having an expansion coefficient different from that of the substrate, an expansion coefficient transient region is provided without having an adverse effect on the optical characteristic of the waveguide. As a result, a distortion in the waveguide is reduced and the glass waveguide is stable.

In the present invention, in order to form a low loss waveguide for an optical circuit by reducing light scattering on the boundary between the core and cladding layers of the waveguide, the refractive index of the core is lowered in the vicinity of the boundary between the core and cladding layers so that the optical waveguide region is confined within the inner side of the boundary. In order to reduce the refractive index of the core in the vicinity of the boundary between the core and cladding layers, it is preferably to volatilize the additive added to the core glass after the core layer is etched so as to increase the refractive index or to diffuse the additive in the core to reduce the refractive index of the core glass. Such additive is preferably B$_2$O$_3$ or F.

The structive of a waveguide with such a construction is shown in FIG. 17A. Here, reference numeral 101 designates a silica glass substrate with a refractive index of 1.46, and 102 is a core made of, for example, SiO$_2$ glass containing GeO$_2$ and P$_2$O$_5$ by 8 to 9%, respectively. By reducing the concentration of the additive in the vicinity of the boundary of the core 102, the core 102 has a refractive index distribution, as shown in FIG. 17B, in the cross section taken along line A—A'. In the case of a multi-mode waveguide, as an example of a glass waveguide, the dimensions of the core 102 are a=b=50 μm. Reference numeral 103 designates a clad of a SiO$_2$ glass layer having a thickness of 70 μm and containing, as additives, for example, P$_2$O$_5$ and B$_2$O$_3$ by 10%, respectively.

Figure 18A:
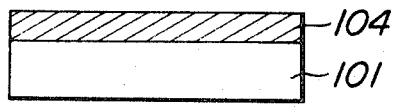
FIGS. 18A to 18E are cross sectional views illustrating the sequence of steps for fabricating a glass waveguide for an optical circuit according to the invention, in which the refractive index of the core is reduced in the vicinity of the boundary between the core and the clad.
Figure 18B:
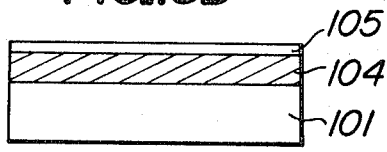
Figure 18C:
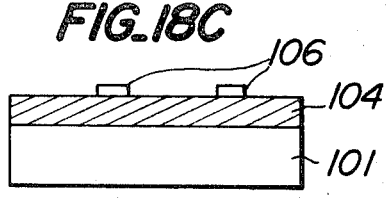
Figure 18D:
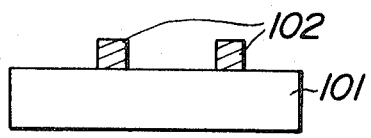
Figure 18E:
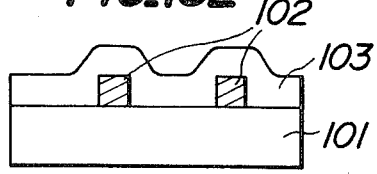

A waveguide for an optical circuit with such a construction may be fabricated by the sequence of manufacturing steps shown in FIGS. 18A to 18E. A high refractive index glass layer 104 containing SiO$_2$ as a major component and oxides such as GeO$_2$, P$_2$O$_5$, TiO$_2$, B$_2$O$_3$ or the like as additives is deposited on the silica glass substrate 101 by oxidizing raw material such as SiCl$_4$, GeCl$_4$, PCl$_3$, POCl$_3$, TiCl$_4$, BBr$_3$ or the like, as shown in FIG. 18A. Then, a metal layer 105 such as Si or Ti is formed on the glass layer 104 by an evaporation or sputtering process, as shown in FIG. 18B. The metal layer 105 is etched into a desired waveguide pattern 106 by photolithography, as shown in FIG. 18C. By using the pattern 106 as a mask, the glass layer 104 is etched by the reactive sputter etching method using Freon gas to form the core 102, as shown in FIG. 18D. Then, the core 102 is heated at 1,200° C. for 10 hours to volatilize GeO$_2$ and P$_2$O$_5$ added to the core glass, so that the refractive index of the core 102 is reduced in the vicinity of the boundary between the core 102 and the clad 103. As shown in FIG. 18E, the substrate 101 and the core 102 are then coated with a transparent glass layer having a low refractive index and containing SiO$_2$ as a major component and oxides such as P$_2$O$_5$, B$_2$O$_3$ or the like as additives to form the clad 103.

According to the present invention, as described above, in the waveguide with multi-layered glass layers, the refractive index of the core layer is reduced in the vicinity of the boundary between the core and clad so that the waveguide region is confined within the inner side of the boundary between the core and clad. As a result, the scattering of light rays due to the irregularity of the core side faces is prevented and the waveguide for an optical circuit has a low loss. Since the irregularity of the core side faces caused by the etching is 0.1 μm to 100 Å, the loss of a conventional waveguide is 4 to 5 dB/cm, but the loss is improved to 0.1 dB/cm according to the present invention.

A glass waveguide for an optical circuit and a fabrication method thereof according to the present invention having the following advantageous effects.

(1) Fine glass particles are produced by oxidation or hydrolysis within a closed reaction vessel to be deposited on the substrate under a condition such that a temperature gradient is provided along a portion where fine glass particles are to be deposited and the glass particles are heated and vitrified into a transparent glass layer. Therefore, the glass film thus formed is of high purity with little fluctuation of its composition and thickness, so that a low-loss glass film for a waveguide having a desired refractive difference and a thickness of several to 50 μm can be manufactured within a short time. According to the present invention, fine glass particles are uniformly deposited on a plurality of substrates simultaneously. Accordingly, the present invention can be used to manufacture a high quality glass waveguide with a high productivity. This means that the fabrication method of the present invention is suitable for mass production.

(2) A glass layer is etched by a reactive sputter etching process using Freon gas, so that the etching rate is high with a good etching selectivity and no undercutting is involved. Therefore, both single mode and multi-mode waveguides with high accuracy of dimensions can be manufactured within a short time.

(3) Between a core layer and a substrate is provided a transient layer in which the expansion coefficient changes gradually between the core layer and the substrate, so that distortion produced in the waveguide by heat is reduced. Therefore, the glass waveguide which is free from a crack and breakdown caused by the crack may be fabricated with high reproducibility.

(4) The glass softening temperatures of the multi-layered glass layers are successively decreased from the substrate side toward the upper layer, so that the cross sectional configurations and dimensions of the successive glass layers are maintained precisely during the heating process for vitrification. Accordingly, a glass waveguide according to the present invention is suitable for manufacturing a single mode waveguide device such as directional couplers, ring resonators or the like and a multi-mode waveguide device such as beam dividers, beam combiners, branching circuits or the like.

(5) Since the refractive index of the core layer is reduced in the vicinity of the boundary between the core and clad, the optical waveguide region is confined within the inner side of the boundary. As a result, light scatter due to the irregularity of the core side faces is prevented and this waveguide for an optical circuit has a low transmission loss.

What is claimed is:

1. A method of fabricating a glass waveguide for use in an optical circuit, said waveguide being formed of a substrate having laminated glass layers of different refractive indexes thereon, said method comprising the steps of:

placing at least one substrate in a reaction vessel having a reacting section and depositing section, the inlet of said depositing section being in the vicinity of the outlet of said reacting section;

establishing a temperature gradient in the depositing section of said reaction vessel which gradually decreases from the inlet to the outlet thereof, the temperature gradient in the vicinity of said substrate being within the range 1° C./cm to 20° C./cm;

introducing glass forming gases into said reaction vessel, said glass forming gases comprising (1) halides of elements selected from the group consisting of Si and Ti, B, P and Ge, and (2) one of oxygen and steam;

heating said glass forming gases, said glass forming gases being heated in a vapor phase to form fine glass particles by thermal oxidation or by hydrolysis, the reaction temperature at the inlet of said depositing section being selected so that said fine glass particles are formed by said glass forming gases;

depositing said fine glass particles on said substrate;

heating said substrate and deposited fine glass particles thereby vitrifying said particles into a transparent glass layer having a relatively high refractive index;

removing portions of said transparent glass layer in accordance with a predetermined pattern to form a core for said waveguide; and covering said core with a material having a refractive index which is lower than the refractive index of said core.

2. A method of fabricating a glass waveguide as claimed in claim 1, wherein said fine glass particles are formed by thermal oxidation, and wherein the temperature of said substrate is within the range from 800° to 1200° C.

3. A method of fabricating a glass waveguide as claimed in claim 2, wherein oxygen is introduced into said reaction vessel for flow in a predetermined direction therethrough.

4. A method of fabricating a glass waveguide as claimed in claim 1, wherein said fine glass particles are formed by hydrolysis, and wherein the temperature of said substrate is within the range from 600° to 1100° C.

5. A method of fabricating a glass waveguide as claimed in claim 4, wherein steam is introduced into said reaction vessel for flow in a predetermined direction therethrough.

6. A method of fabricating a glass waveguide as claimed in claim 1, wherein said glass forming gases are thermal-oxidized or hydrolyzed in the reacting section of said reaction vessel to form said fine glass particles, and wherein said at least one substrate is placed in the depositing section of said reaction vessel for deposition of said fine glass particles thereon.

7. A method according to claim 1, wherein said at least one substrate is made of one of silica glass and ceramic.

8. A method according to claim 1, wherein portions of said transparent glass layer are removed by a reactive sputter etching process employing Freon gas.

* * * * *